United States Patent [19]

Fielding

[11] 3,715,525

[45] Feb. 6, 1973

[54] TELEPHONE HANDSET SHUTTER ATTACHMENT

[76] Inventor: Gordon Wilder Fielding, 11 Bruce Circle, Randolph, Mass. 02368

[22] Filed: Aug. 12, 1971

[21] Appl. No.: 171,274

[52] U.S. Cl. ....................................................179/187

[51] Int. Cl. ....................................................H04r 1/08

[58] Field of Search...............179/187, 188, 180, 103

[56] References Cited

UNITED STATES PATENTS 2,425,061 8/1947 Hart....................................179/188

*Primary Examiner*—Thomas W. Brown

*Attorney*—Jack Larsen

[57] ABSTRACT

The shutter attachment disclosed clips over the mouthpiece and handle of a standard telephone handset and provides means by which pressing a button on the handle portion of the attachment, a valve closes against a valve plate, shutting off the telephone transmitter to ambient noise. Alternative embodiments are shown for lever operation of the valve and for pneumatic linkage. Constrained layer construction provides efficient exclusion of noise.

11 Claims, 2 Drawing Figures

TELEPHONE HANDSET SHUTTER ATTACHMENT

This invention relates to telephony and particularly to an attachment to the standard telephone handset, to reduce interference by ambient noise, herein termed a noise shutter.

In telephone handsets in general use, the transmitter is subject to any environmental noise when the handset is removed from the stand or hook so that the listener experiences difficulty in hearing the talker. The noise that enters the mouthpiece is amplified by the carbon-button microphone and the resulting electrical signal mixes with the signal from a remote location. This noise may be largely eliminated by a "push-to-talk" switch on the handset; but this is not standard equipment. In some systems the telephone company will wire one of the switches connected to the buttons in the cradle which may be activated to disable the transmitter when one of the buttons is pulled up. This feature is not standard and requires two-hand operation. Other mechanical devices have been employed to shutter the mouthpiece for this purpose, such as a rotating shutter. A rotating shutter requires an awkward motion, and, if tight enough to exclude the sound, requires considerable operating force.

It is an object of the present invention to provide a cheap, simple, and effective shutter, which may be attached to a standard telephone instrument without tools and without modification of the instrument or its mode of operation.

It is a further object of the invention to provide a mechanical acoustic shutter with improved sound isolation; and it is a further object to provide a shutter with simple push-and-slide one-handed operation.

Other objects of the invention will in part be obvious and will in part appear hereinafter.

A feature by which the above objects are achieved is a simple flapper valve of constrained-plate construction. Another feature is a housing designed to engage under the receiver cap and extending along the handle of the handset to envelop and cover the transmitter, being attached thereto. Still another feature is the use of spring hooks to snap over the handset mouthpiece cap to retain the housing; and a further feature is a stepped push-button in the handle connected by linkage to operate the valve.

The invention accordingly comprises the features of construction, combinations of elements, and arrangement of parts, which will be exemplified in the constructions hereinafter set forth, and the scope of the invention will be indicated in the claims.

Figure 1:
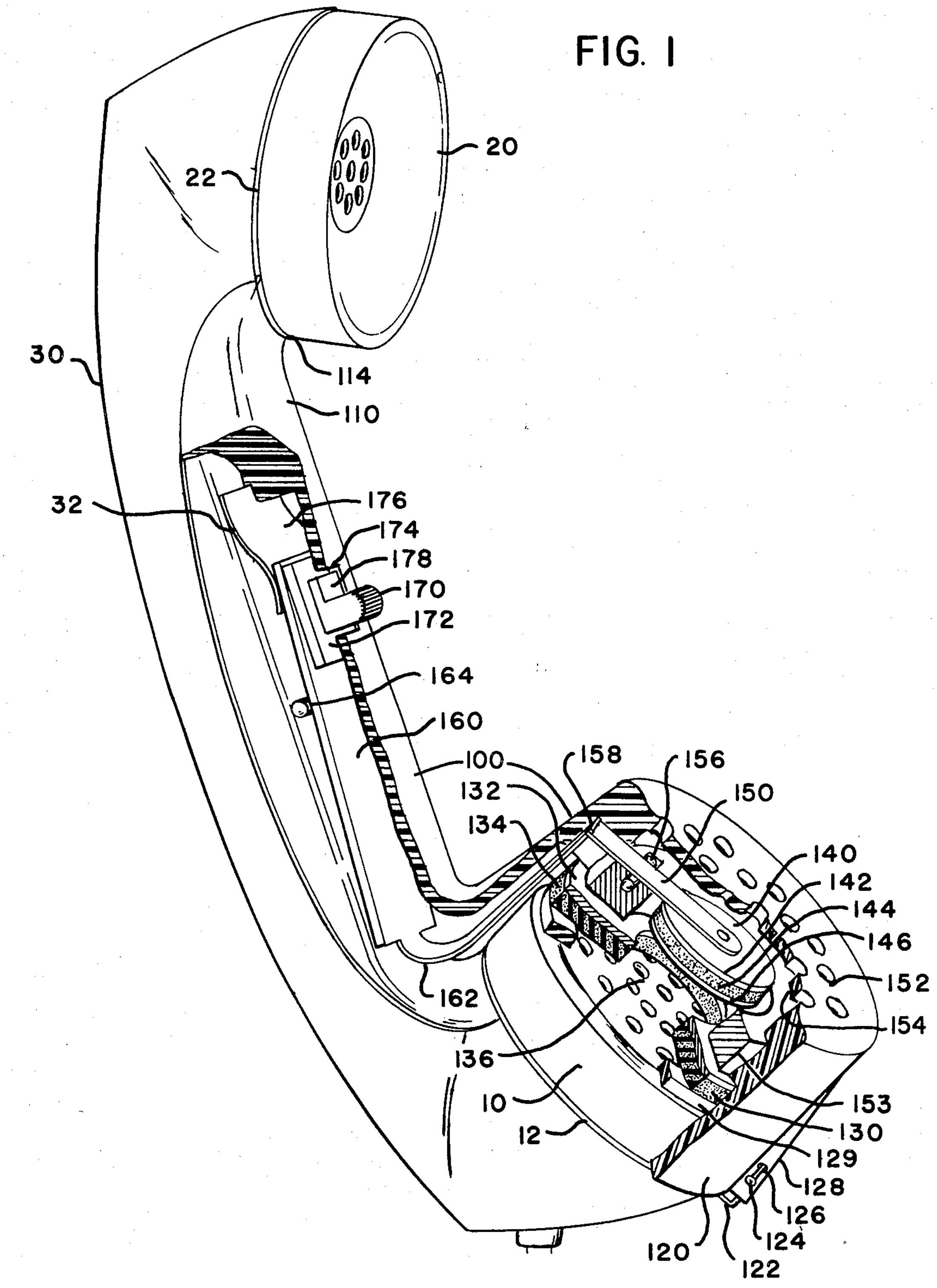
Figure 2:
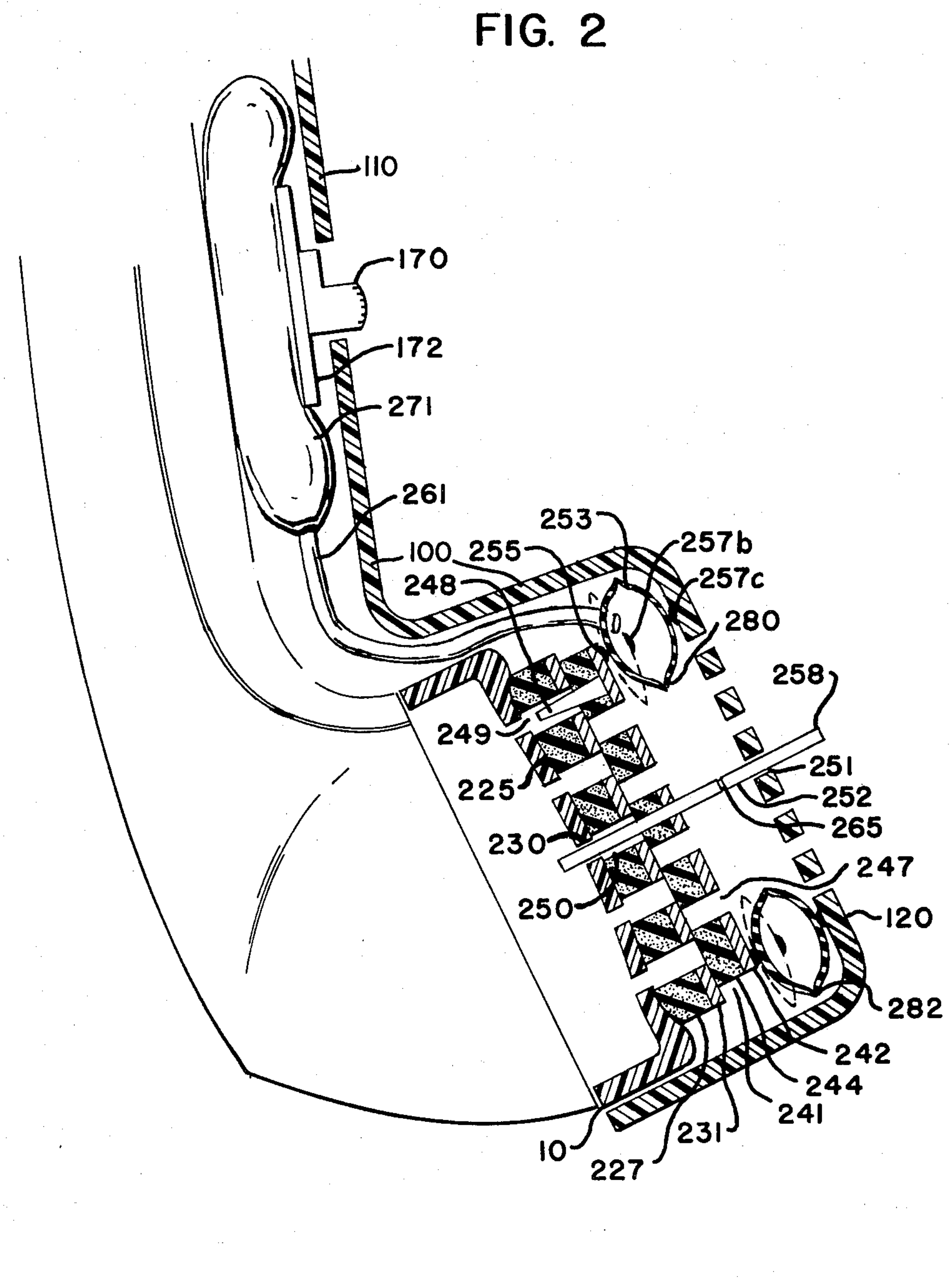

For a fuller understanding of the nature and objects of the invention, reference should be had to the following detailed description taken in connection with the accompanying drawings, in which:

FIG. 1 is a partially cut-away illustration of the preferred embodiment of the invention, and FIG. 2 is an illustration of an alternative construction for the valve and an alternative pneumatic operating linkage for the valve.

Referring now to FIG. 1. A conventional Western Electric Model 500 handset (of which many millions are in service) is shown in outline and comprises a transmitter (not shown) at one end covered by a mouthpiece 10 having an edge 12, and a receiver (not shown) at the other end covered by an earpiece 20 having an edge 22, and a handle 30 having a generally flattened portion 32 for resting in the cradle (not shown) when the phone is "hung up." The older Model 100 Western Electric instrument and instruments manufactured by General Telephone and Stromberg-Carlson Division General Dynamics are similar, and the invention may be adapted to any of these instruments.

The invention comprises a housing 100 having a handle portion 110 to fit the flattened portion 32 of the handset, a lip 114 to engage the edge 22, and a mouthpiece cap 120, the handle and mouthpiece cap conforming in general appearance to the telephone handset. For installation, the lip 114, which is curved and moulded to perfectly fit beneath the earpiece edge 22, is placed under the edge, and the mouthpiece cap 120 is lowered over the mouthpiece 10. Spaced around the mouthpiece cap are three spring clips 122, (only one being shown) each of which is held open by a common pin 124 inserted in a hole 126 through a clip boss 128, which covers each clip. Removal of the pins allows the clips to grasp the edge 12 of the mouthpiece holding the shutter tightly against the handset. To take up minor manufacturing variations, a resilient sealing ring 129 seats against the face of the mouthpiece. Secured to the cap 120 and supporting the sealing ring 129 is a valve plate 130. It is preferred that this plate be of "-constrained layer" construction wherein a layer 132 of metal is backed with a layer 134 of sound damping material and have a central aperture 136 about three-fourths inch in diameter. Covering this central aperture is the valve 140, also preferably of constrained layer construction. This may be of three layer or two layer construction with an upper metal layer 142 providing structural rigidity. A central soft sound deadening layer 144 may be covered on the bottom with a thin metallic layer 146. The valve is operated by a valve operating arm 150 which is thin and flexible so that when the valve is closed the face layer 146 is allowed to conform closely to the valve plate layer 132.

The valve 140 is raised and lowered in a space between the perforated face 152 of the mouthpiece cap and the top of the valve plate. This space, less than half an inch deep must be large enough to allow sound to flow freely around the valve top and bottom when it is open. A spacer ring 153 surrounds this space and supports the valve plate against the circumference of the lower surface 154 of the face mouthpiece cap 152.

The spacer ring 153 carries a pivot 156 for the valve operating arm 150 and surrounds the arm closely to stop excessive acoustic leakage.

Outside of the space ring 153, the operating arm is hinged at 158 to the end of a transfer lever 160. The lever 160 is carried outside of the valve plate 130 and the sealing ring 129 and inside the housing, turning at the angle 162, where it may be hinged, to extend inside the handle portion 110 past a pivot 164 on which it turns to the push-button 170. Between the hinge 158 and the angle 162, the lever transmits compression and need not be, and preferably is not stiff. From the angle 162 to the button 170 the lever transmits bending force and the lever is wider and stiffer in this region. The button 170 has a flat foot 172 which slides on the flat top of the lever 160. The button 170 and that end of the lever 160 are pressed upward through a slot 174 by a spring 176. The slot 170 is elongated to permit the button, when depressed, to be slid toward the receiver end of the handset. A step 178 on that side of the button 170 permits the button to stay in the down position.

It will be recognized that there are many alternative possible linkages between the button and the valve. For example, a spring steel band may be connected near the lip 114, extend under the button 170 along the handle and up and over the valve plate and valve to be fastened at the far side of the valve plate. Fastened to the valve and bent to hold the valve open, the band would pull the valve closed when the button is pressed to bend its end of the band.

FIG. 2 represents a pneumatic linkage, an alternative construction in which advantage is taken of the perforated mouthpiece to form the bottom layer of a constrained layer valve plate.

In this construction, the first step of assembly is to strip off a protecting cover from the bottom 225 of the layer 227 of foamed type damping material contoured to match the mouthpiece 10 and having holes 229 to match the pattern of the cluster of holes in the mouthpiece. The mouthpiece has a hole 230 in the center. The upper layer 231 of the valve plate is flat and of metal.

The valve 241 shown in the closed position comprises an upper metal layer 242 and a lower layer 244 of soft sound deadening material. The valve has a cluster of holes 247 in a pattern non-overlapping the pattern of the mouthpiece, and a tapered locating pin 248 to engage one of the holes 249 in the outer ring of the pattern of the valve plate. Passing through the center of the valve to engage the central holes 230, 250, 251 of the mouthpiece, the guide plate and the mouthpiece cap 120 respectively is a guide pin 252. A generally toroidal air bag 253 is cemented around the edge of the valve 241 at 255.

As originally sold, the air bag 253 has a circle of pressure-sensitive adhesive around its top at **257*b* and the cap 120 has a corresponding circle at 257*c*, the bag assuming its preferred flat configuration as indicated by dotted lines. Upon first assembly to the instrument, the extending portion 258 of the pin 252 is manipulated to insure that it engages the central hole 250 of the valve plate and rotated to engage the pin 248 in the hole 249. When this is done, the air bag is inflated through the tube 261 by pressing the button 170 against an elongated, normally inflated air bag 271. The foot 172 of the button is preferably more extensive in this application. The inflation of the ring bag 253 brings the pressure-sensitive-adhesive circles 257*b* and 257*c* together in precisely the correct orientation. A firm upward pull on the extension 258 of the pin 252 consolidates the adhesion between the rings 257*b* and 257*c* and snaps off the extension 258 at the point 265 where the pin 252** is scored.

The bag 253, the tube 261, and the bag 271 are preferably formed by stamping and heat-sealing out of sheets of flat elastomeric material. When the bag 253 is formed in this way, semi-rigid rings are created at the inside 280 and at the outside 282, either by the beading of the heated material or by adding rings of stiffer material. These rings cause this ring bag to tend toward a natural condition of flatness while the shape of the elongated bag 271 causes it to respond primarily to internal pressure. Accordingly, upon release of the pushbutton 170 the valve 241 springs open for normal conversation until pressure on the button 170 again seats the valve 241 against the plate 231.

There are various sound damping materials that may be employed to make the constrained layer sandwiches. I prefer a duPont product available in sheet form under the trade name Elastomer LR3–604. Other suppliers are Soundcoat Corp. which has a 0.050 inch damping sheet type GP-2. Soundcoat also makes a paste damping compound GP-1. Other paste-type materials are Ferro Corporation's Coustidamp, Lord LDS Series Damping Compound, Lord Manufacturing Co., Wakefield, Massachusetts, and Korfund Vibrodamper Compound available from Sussman Associates, Framingham, Massachusetts.

It will thus be seen that the objects set forth above, among those made apparent from the preceding description, are efficiently attained, and since certain changes may be made in the above constructions without departing from the scope of the invention, it is intended that all matter contained or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

I claim:

1. For attachment to a telephone handset of the type having a transmitter at one end, a receiver at the other end, and an interconnecting handle, all proportioned to permit a generally flat perforated mouthpiece to be held proximate to the lips of a user, with said receiver proximate to an ear of said user, a shutter comprising:
   a. a housing having a handle portion and a mouthpiece portion, shaped to fit against said handle and around said mouthpiece respectively, and having a perforated mouthpiece cap substantially conforming to said mouthpiece and adapted to be positioned in generally parallel spaced-apart relationship to said mouthpiece,
   b. a generally flat, perforated valve plate spaced apart from said cap and adapted to fit over the perforations of said mouthpiece,
   c. sealing means adapted to surround the perforations of said plate and mouthpiece to seal said plate to said mouthpiece,
   d. a generally flat valve constrained between said plate and said cap movable between an open position spaced apart from said plate and a closed position seated on said plate,
   e. means for retaining said shutter against said handset,
   f. a control button within said handle portion depressible to control said valve, and
   g. linkage within said handle operably interconnecting said button and said valve.

2. A shutter as defined by claim 1,
   h. wherein said linkage comprises a valve operating arm, fastened at one end to said valve, pivoted at the edge of said plate, and a transfer lever connected to the other end of said arm and extending past a pivot point in said handle portion to said button.

3. A shutter as defined by claim 2, h. wherein said button is stepped and carried in a slot so that when pressed it may be slid sideways to be locked in its depressed condition.

4. A shutter as defined by claim 1, h. wherein said linkage comprises a first, normally inflated air bag, adapted to be squeezed by said button, a normally deflated air bag, adapted to hold said valve open in its deflated state and to close said valve in its inflated state, and an interconnecting tube.

5. A shutter as defined by claim 4 wherein said normally deflated air bag is in the form of a ring bag fastened at a first contact circle to said valve and at a second contact circle to said cap.

6. A shutter as defined by claim 1 (h) wherein said valve comprises a constrained layer sandwich.

7. A shutter as defined by claim 4 (i) wherein said valve plate comprises a constrained layer sandwich.

8. A shutter as defined by claim 1 (h) wherein said means for retaining comprises a spring clip having a hooked portion situated to engage the edge of said mouthpiece.

9. A shutter as defined by claim 1 (h) wherein said valve plate has a single large central aperture.

10. A shutter as defined by claim 1 (h) wherein said valve plate is perforated by a plurality of holes in a predetermined pattern, and said valve is perforated by a plurality of holes in a second predetermined pattern non-overlapping said first pattern.

11. A shutter as defined by claim 5 wherein said valve plate is perforated by a cluster of holes in a predetermined pattern, and said valve is perforated by another cluster of holes in a second predetermined pattern non-overlapping said first pattern, and lying within said first circle.

* * * * *